(12) United States Patent
Park

(10) Patent No.: US 8,666,370 B2
(45) Date of Patent: Mar. 4, 2014

(54) METHOD FOR UPDATING PHONEBOOK AND PORTABLE TERMINAL ADAPTED THERETO

(75) Inventor: Se Jin Park, Seoul (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 650 days.

(21) Appl. No.: 12/655,652

(22) Filed: Jan. 5, 2010

(65) Prior Publication Data
US 2010/0173613 A1    Jul. 8, 2010

(30) Foreign Application Priority Data
Jan. 5, 2009   (KR) .................. 10-2009-0000280

(51) Int. Cl.
*H04M 1/72* (2006.01)

(52) U.S. Cl.
USPC ............... 455/412.1; 455/415; 455/414.1; 455/418; 379/88.2; 379/142.01

(58) Field of Classification Search
USPC ........... 455/412.1, 415, 414.1, 418; 379/88.2, 379/142.01
See application file for complete search history.

(56) References Cited

U.S. PATENT DOCUMENTS 6,381,324 B1 *   4/2002   Shaffer et al. ............ 379/211.02

* cited by examiner

*Primary Examiner* — Nghi H Ly

(57) ABSTRACT

A portable terminal can analyze a voice of the other party and update a phonebook. A voice pattern can be extracted from an incoming voice signal. A determination is made whether the extracted voice pattern is contained in a list of voice patterns stored in the portable terminal. If the extracted voice pattern is contained in the list, a determination is made whether a stored phone number matches a received phone number. If the stored phone number is not identical to the received phone number, the stored phone number is changed with the received phone number. Therefore, the phonebook can be automatically (e.g., without user input) updated although the user does not directly change and store phone numbers of other parties.

20 Claims, 5 Drawing Sheets

US 8,666,370 B2

METHOD FOR UPDATING PHONEBOOK AND PORTABLE TERMINAL ADAPTED THERETO

CROSS-REFERENCE TO RELATED APPLICATION(S) AND CLAIM OF PRIORITY

The present application is related to and claims priority to an application entitled "METHOD FOR UPDATING PHONEBOOK AND PORTABLE TERMINAL ADAPTED THERETO" filed in the Korean Intellectual Property Office on Jan. 5, 2009 and assigned Serial No. 10-2009-0000280, the contents of which are incorporated herein by reference.

TECHNICAL FIELD OF THE INVENTION

The present invention relates to communication systems. More particularly, this invention relates to a method that analyzes the voice of the other party and updates a phonebook, and to a portable terminal adapted to the method.

BACKGROUND OF THE INVENTION

In recent years, the number of people using portable terminals has rapidly increased and portable terminals serve as an essential tool for modern life. Portable terminals have been developed to provide services for transmitting various types of data, a variety of additional services, and so forth, as well as a voice call service, and thus serve as multimedia communication devices.

Portable terminals generally provide a phonebook function. Portable terminal users can store other parties' names and phone numbers in the phonebook of the portable terminals, and search for a phone number there from using various types of keywords, such as the other party's name or part of the name, or a portion of the digits composing a phone number, and the like. With the development of portable terminals, the phonebook function has been further enhanced to save addresses, email addresses, photographs, personal information, and so forth, of the other parties, as well as phone numbers.

The caller ID display service is commonly used among portable terminal users. If a called portable terminal receives a call with a phone number stored therein from a caller portable terminal, it displays the caller ID on the display so that the called party can recognize the caller. If the caller transmits a call with a phone number that differs from his/her previous phone number to the called party, the called portable terminal receives the call with the changed phone number. Since the called party does not have the changed phone number of the caller, the called party needs to store the changed phone number in the phonebook. To this end, the called party must search for the caller's name from the phonebook, delete the caller's existing phone number therefrom, and store the caller's changed phone number therein. In particular, if a plurality of phone numbers stored in the phonebook need to be changed, the portable terminal user must perform the procedures described above with respect to each phone number, which inconveniences the user. Meanwhile, if the user does not change and store a phone number, the phone number is never updated in the portable terminal.

Therefore, a method is required to automatically update a phonebook, although the portable terminal user does not directly change and store the phone numbers in the portable terminal.

SUMMARY OF THE INVENTION

To address the above-discussed deficiencies of the prior art, it is a primary object to provide a method that can automatically update a phonebook in a portable terminal, although a portable terminal user does not directly change and store phone numbers of other parties in the portable terminal.

The present invention further provides a portable terminal adapted to the method that can automatically update a phonebook in a portable terminal.

In accordance with an exemplary embodiment of the present invention, the present invention provides a method for updating phone numbers including: extracting a voice pattern from a voice signal if an incoming call with the voice signal is received; determining whether the extracted voice pattern is contained in a list of voice patterns stored in the portable terminal; determining, if the extracted voice pattern is contained in a list of voice patterns stored in the portable terminal, whether a stored phone number is identical to a received phone number, wherein the stored phone number is associated with one of the list of voice patterns that is identical with the extracted voice pattern, and stored in the portable terminal, and the received phone number is received with the incoming call; and changing the stored phone number with the received phone number if the stored phone number is not identical to the received phone number.

In accordance with another exemplary embodiment of the present invention, the present invention provides a method for updating phone numbers including: determining whether a phone number, received when an incoming call is received, is contained in a list of phone numbers stored in the portable terminal; extracting a voice pattern from a received voice signal if the received phone number is not contained in a list of phone numbers; determining whether the extracted voice pattern is contained in a list of voice patterns stored in the portable terminal; and changing, if the extracted voice pattern is contained in a list of voice patterns, a stored phone number with the received phone number, wherein the stored phone number is associated with one of the list of voice patterns that is identical with the extracted voice pattern, and stored in the portable terminal.

In accordance with another exemplary embodiment of the present invention, the present invention provides a portable terminal that updates phone numbers, including: a radio frequency (RF) communication unit for receiving a voice signal and phone number information; a storage unit for storing phone numbers associated with voice patterns; and a controller. The controller extracts a voice pattern from a voice signal received via the RF communication unit. The controller determines whether the extracted voice pattern is stored in the storage unit. If the extracted voice pattern is stored in the storage unit, the controller determines whether a stored phone number is identical to a received phone number. The stored phone number is associated with one of the voice patterns stored in the storage unit that is identical with the extracted voice pattern. The received phone number is received via the RF communication unit. The controller controls the storing unit to change the stored phone number with the received phone number if the stored phone number is not identical to the received phone number.

In accordance with another exemplary embodiment of the present invention, the present invention provides a portable terminal that updates phone numbers, including: an RF communication unit for receiving a voice signal and phone number information; a storage unit for storing phone numbers associated with voice patterns; and a controller. The controller determines whether a phone number, received via the RF communication unit, is stored in the storage unit. If the received phone number is not stored in the storage unit, the controller extracts a voice pattern from a voice signal, received via the RF communication unit. The controller determines whether the extracted voice pattern is stored in the storage unit. If the extracted voice pattern is in the storage unit, the controller controls the storage unit to change a stored phone number with the received phone number. The stored phone number is associated with one of the voice patterns stored in the storage unit that is identical with the extracted voice pattern.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 4, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system.

The term 'voice pattern' refers to data to identify a voice of other party. Differences in the structure of the larynx, vocal tract and articulators lead to different voice characteristics. That is, people have different voice patterns due to the different lengths and features of vocal cords. Portable terminals can extract a voice pattern from a received voice signal and identify a voice of the other party. The voice pattern can include a plurality of parameters, such as, a sound pitch (frequency), a sound intensity (amplitude), a voice tone (inherent characteristic of a waveform), speed of pronunciation, pronunciation features (tempo, intonation, accent, the use of words), and the like.

Hereinafter, exemplary embodiments of the present invention are described in detail with reference to the accompanying drawings. The same reference numbers are used throughout the drawings to refer to the same or similar parts. Detailed descriptions of well-known functions and structures incorporated herein may be omitted to avoid obscuring the subject matter of the present invention.

Figure 1:
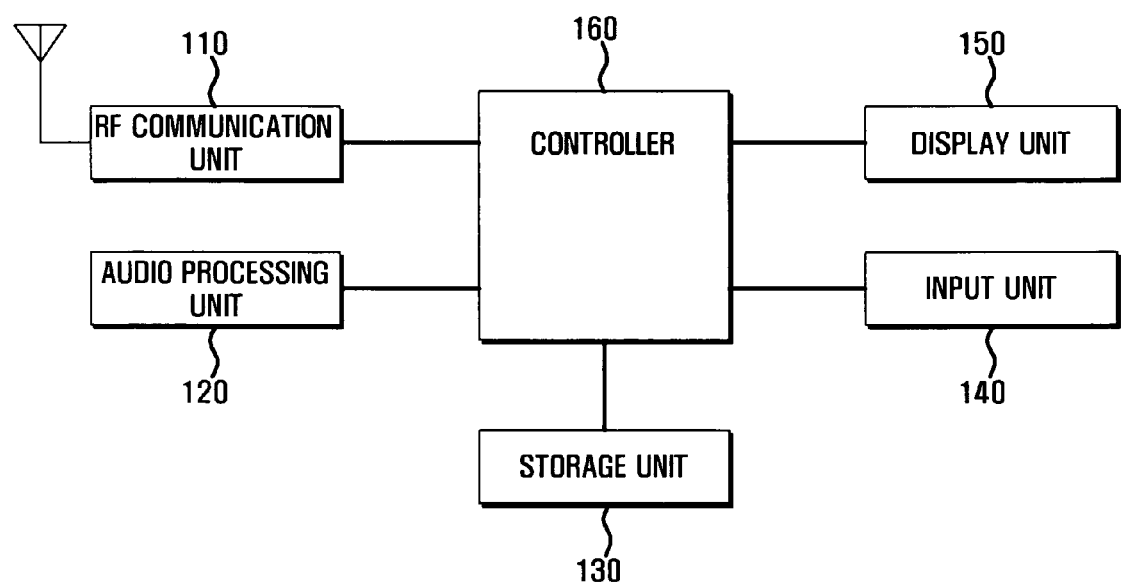
FIG. 1 illustrates a portable terminal that can update a phone number, according to an embodiment of the present invention.

FIG. 1 illustrates a portable terminal that can update a phone number, according to an embodiment of the present invention.

The portable terminal includes an RF communication unit 110, an audio processing unit 120, a storage unit 130, an input unit 140, a display unit 150, and a controller 160.

The RF communication unit 110 serves to perform RF communication with other portable terminals. The RF communication unit 110 includes an RF transmitter for up-converting the frequency of transmitted signals and amplifying the transmitted signals and an RF receiver for low-noise amplifying received RF signals and down-converting the frequency of the received RF signals. The RF communication unit 110 receives data via an RF channel and outputs it to the controller 160 and transmits data from the controller 160 to the other terminals via the RF channel. In an embodiment of the present invention, the RF communication unit 110 receives caller ID information and voice signals and outputs to them to the controller 160.

The audio processing unit 120 includes a codec (coder & decoder). The codec can be configured to include a data codec that processes packet data, and an audio codec that processes audio signals, such as a voice signal. The audio processing unit 120 converts digital audio signals into analog audio signals and reproduces them via a speaker SPK, using the audio codec. The audio processing unit 120 also converts analog signals, input via a microphone MIC, into digital audio signals using the audio codec. In an embodiment of the present invention, the audio processing unit 120 converts voice signals, received via the RF communication unit 110, into analog audio signals and then reproduces them via the speaker SPK. The audio processing unit 120 also converts analog audio signals, received via the microphone MIC, into digital audio signals and the outputs them to the controller 160. In particular, the audio processing unit 120 receives a user's voice and outputs a voice signal to the controller 160.

The storage unit 130 stores the application program necessary for the operations of the portable terminal and data generated as the portable terminal is operated. The storage unit 130 includes a program storing area and a data storing area. In an embodiment of the present invention, the storage unit 130 stores a list of phone numbers and a list of voice patterns. The storage unit 130 stores phone numbers, associated with voice patterns, respectively. That is, each phone number is stored together with a corresponding user's name and voice pattern. The voice pattern is stored with parameters, such as voice pitch (frequency), voice intensity (amplitude), sound tone (inherent characteristic of waveform), pronunciation speed, and other pronunciation features (tempo, intonation, accent, the use of words, and so forth). In an embodiment of the present invention, the parameters for a voice pattern, used to recognize a speaker's emotions, can further include a pitch average, a pitch standard deviation, the pitch maximum, an energy average, an energy standard deviation, and the like. The pitch refers to the fundamental frequency in a voice spectrum.

The input unit 140 receives a user's key operating signals for controlling the portable terminal and outputs them to the controller 160. The input unit 140 can be implemented with a keypad containing numerical and direction keys. If the portable terminal is configured to include a touch screen, the input unit 140 may also be implemented with a touch pad. If the portable terminal is configured to include image sensors, acceleration sensors, and the like, they may compose the input unit 140.

The display unit 150 is implemented with a liquid crystal display (LCD). The display unit 150 displays menus, input data, information regarding function settings, and other various types of information, contained in the portable terminal. For example, the display unit 150 displays a booting screen, an idle screen, a display screen, a call screen, other application program executing screens, and the like. In an embodiment of the present invention, the display unit 150 displays a call screen under the control of the controller 160, and a caller ID on the call screen. The display unit 150 can also display a message asking whether the user wishes to update a phone number, under the control of the controller 160. In an embodiment of the present invention, if a user intends to update phone numbers, the controller 160 controls the display unit 150 to display a message asking whether the user wishes to update a phone number, so that the user can reply to the message via the input unit 140. Alternatively, the display unit 150 can display an input field for receiving a phone number-name to store a phone number, under the control of the controller 160.

The controller 160 controls the entire operation of the portable terminal. The controller 160 includes a codec and a modem. The codec encodes signals to transmit via the RF communication unit 110 or decodes signals received thereby. The modem modulates signals to be transmitted via the RF communication or demodulates signals received thereby. The controller 160 extracts a voice pattern from a voice signal received via the RF communication unit 110. To this end, the controller 160 extracts parameters, such as, a sound pitch (frequency), a sound intensity (amplitude), a voice tone (inherent characteristic of a waveform), speed of pronunciation, pronunciation features (tempo, intonation, accent, the use of words), and the like. The controller 160 identifies whether the extracted voice pattern is stored in the storage unit 130, by comparing the extracted voice pattern with the stored voice pattern. That is, the controller 160 compares parameters composing a voice pattern, such as a frequency, amplitude, waveform, and so forth. In an embodiment of the present invention, if the parameters composing a voice pattern stored in the storage unit 130 were set with ranges of errors, respectively, the controller 160 determines whether the parameters composing the extracted voice pattern are within the ranges of errors, respectively, thereby identifying whether the extracted voice pattern corresponds to the stored voice pattern. When the controller 160 ascertains that the extracted voice pattern is stored in the storage unit 130, it determines whether the phone number associated with the stored voice pattern, i.e., the extracted voice pattern, is identical with a phone number received via the RF communication unit 110. If the controller 160 ascertains that the stored phone number is not identical with the received phone number, it replaces the stored phone number with the received phone number and stores it in the storage unit 130.

Alternatively, before the controller 160 extracts a voice pattern, it can first determine whether a phone number received via the RF communication unit 110 is contained in a list of phone numbers stored in the storage unit 130. When the controller 160 ascertains that a phone number received via the RF communication unit 110 is not contained in a list of phone numbers stored in the storage unit 130, it analyzes a voice signal received via the RF communication unit 110 and then extracts a voice pattern there from. Thereafter, the controller 160 determines whether the extracted voice pattern is stored in the storage unit 130. If the controller 160 ascertains that the extracted voice pattern is stored in the storage unit 130, it replaces the phone number, associated with the stored voice pattern identical with the extracted voice pattern, with a phone number received via the RF communication unit 110 and then stores it.

In the foregoing description, the configuration of the portable terminal according to the present invention has been explained. A detailed description is provided regarding a method for updating phone numbers in the portable terminal.

Figure 2A:
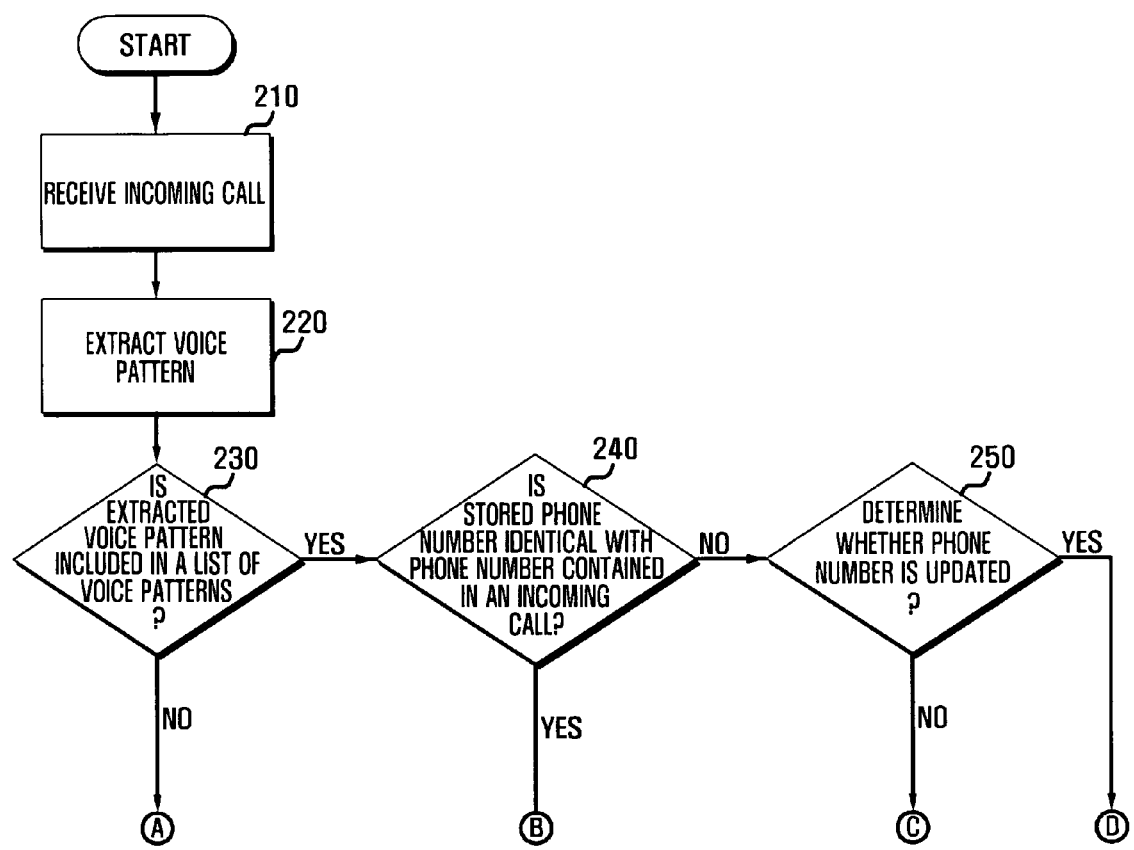
FIGS. 2A and 2B illustrate a method for updating a phone number according to a first embodiment of the present invention.
Figure 2B:
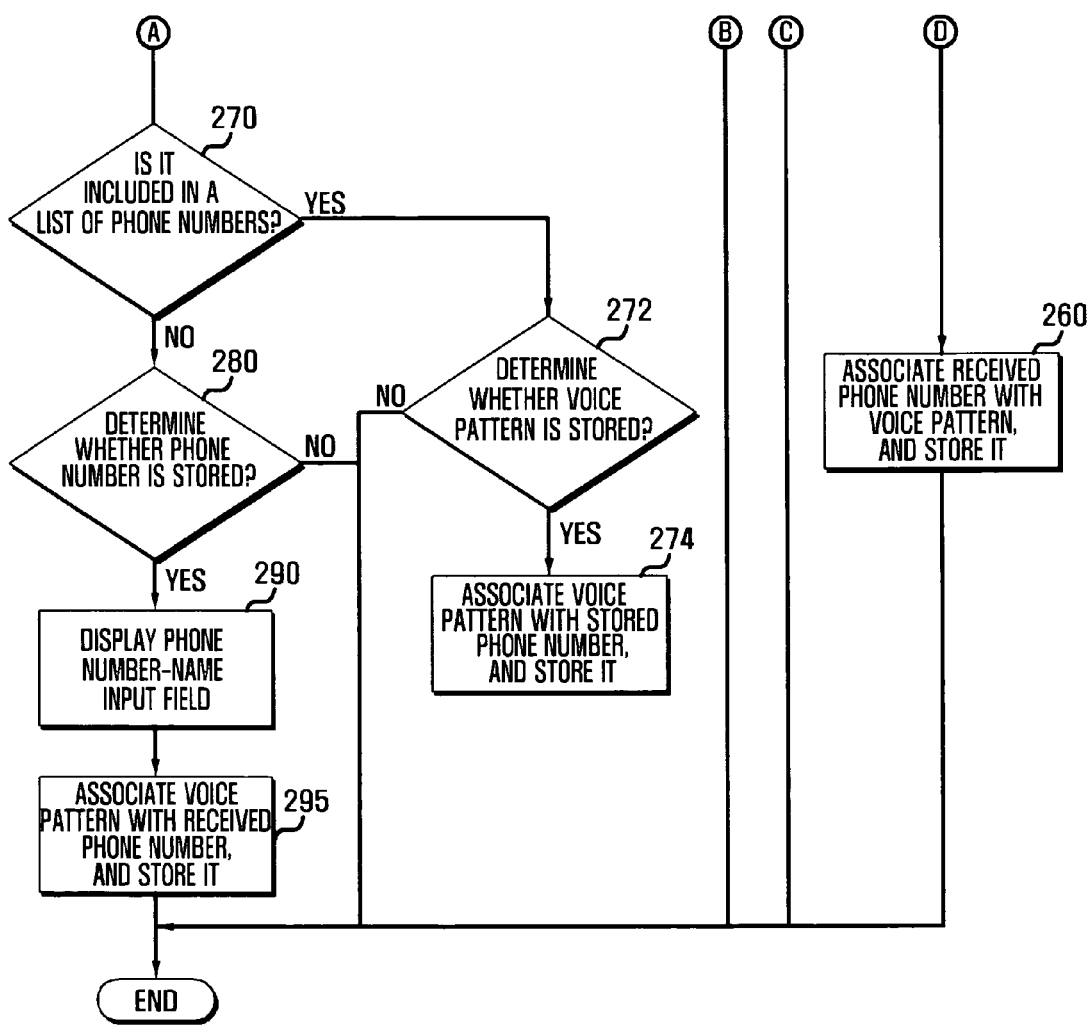

FIGS. 2A and 2B illustrate a method for updating a phone number according to a first embodiment of the present invention. It is assumed that the storage unit 130 stores voice patterns, associated with a phone numbers.

The controller 160 receives an incoming call via the RF communication unit 110 (block 210). The incoming call includes the voice signal and phone number information of a caller. The controller 160 demodulates and decodes the received voice signal, analyzes the processed voice signal, and extracts a voice pattern there from (block 220). To this end, the controller 160 extracts the parameters, such as voice pitch (frequency), voice intensity (amplitude), sound tone (inherent characteristic of waveform), pronunciation speed, and other pronunciation features (tempo, intonation, accent, the user of words, and so forth).

The controller 160 determines whether the extracted voice pattern is included in a list of voice patterns stored in the storage unit 130 (block 230). The storage unit 130 stores phone numbers associated with voice patterns, respectively, where the stored voice patterns composed a list. That is, the controller 160 determines whether the voice pattern, extracted at step 220, is identical with one of the voice patterns in a list stored in the storage unit 130. To this end, the controller 160 checks the accordance between the extracted voice pattern and the stored voice patterns by comparing parameters composing the voice patterns, respectively. That is, the controller 160 determines whether the parameters of the extracted voice pattern are identical with those of the stored voice patterns, respectively, or whether the parameters of the extracted voice pattern are within a preset range of error.

When the controller 160 ascertains that the list of voice patterns contains a voice pattern identical with the extracted voice pattern at 230, it determines whether a phone number associated with the extracted voice pattern is identical with a phone number contained in the incoming call received at 210 (block 240).

If the controller 160 ascertains that a phone number associated with the extracted voice pattern is not identical with a phone number contained in the incoming call at 240, it displays a message asking whether the user wishes to update a phone number (block 250).

That is, the list of voice patterns stored in the storage unit 130 includes a voice pattern identical to the voice pattern extracted at 220, so that a corresponding phone number can be stored and associated with the voice pattern. In that case, it can be assumed that a caller ID was stored in the list of phone numbers. Meanwhile, since the extracted voice pattern is identical to the stored voice pattern at 230 but the received phone number is not identical with the stored phone number at 240, it can be assumed that the caller's phone number has been changed. That is, if the stored phone number is not identical to the stored phone number at 240, the controller 160 ascertains that the caller's phone number has been changed.

In that case, the user may not wish to update the caller's phone number with the changed phone number. Therefore, the controller 160 controls the display unit 150 to display a message asking whether the user wishes to update the caller's phone number at 250. Although the embodiment of the present invention is implemented to include step 250, it should be understood that it may be modified in such a way to immediately update the caller's changed phone number without performing step 250.

When the controller 160 ascertains that the user has selected the update of a caller's phone number at 250, it stores the received phone number in the storage unit 130, associated with the voice pattern (block 260). When the controller 160 stores the received phone number at 260, it may delete and replace the stored phone number with the changed phone number in the storage unit 130. Alternatively, the controller 160 can additionally store the changed phone number in the storage unit 130, associated with the same voice pattern, while retaining the previously stored phone number before being changed. In that case, the controller 160 can set the changed phone number of the two stored phone numbers as a representative phone number. If the changed phone number is set to be the representative number, the portable terminal user searches for the changed phone number, and transmits an outgoing call thereto.

Alternatively, when the controller 160 ascertains that the list of voice patterns does not contain a voice pattern identical with the extracted voice pattern at 230, the controller 160 determines whether the phone number received at 210 is contained in the list of phone numbers stored in the storage unit 130 (block 270). If the controller 160 ascertains that the phone number received at 210 is not contained in the list of phone numbers at 270, it controls the display unit 150 to display a message asking whether the user wishes to store the phone number (block 280). When the controller 160 ascertains that the user has selected to store the phone number at 280, the controller 160 controls the display unit 150 to display a phone number-name input field (block 290). During the step 290, the portable terminal user inputs a name corresponding to the received phone number through the input unit 140, thereby storing a new phone number. When the portable terminal user inputs a phone number-name into the input unit 140, the controller 160 associates the input phone number-name, the received phone number, and the voice pattern with each other and then stores them in the storage unit 130 (block 295). Therefore, through these processes, a new phone number can be stored in the storage unit 130, associated with a voice pattern.

Meanwhile, if the controller 160 ascertains that the phone number received at 210 is contained in the list of phone numbers at 270, the controller 160 controls the display unit 150 to display a message asking whether the user wishes to store the voice pattern (block 272). This process refers to a case where only the received phone number is stored but a voice pattern corresponding thereto is not stored. That is, this process corresponds to the case where the portable terminal user directly inputs a phone number and stores it in the portable terminal.

When the controller 160 ascertains that the user has selected to store a voice pattern at 272, the controller 160 associates the extracted voice pattern with a previously stored phone number and then stores it (block 274). The controller 160 additionally stores data related to a voice pattern, associated with a previously stored phone number, so that it can automatically update the phone numbers if it receives an incoming call with a changed phone number from the same caller.

Meanwhile, if the controller 160 ascertains that a phone number associated with the extracted voice pattern is identical with a phone number contained in the incoming call at 240, the controller 160 terminates the procedure. When the controller 160 ascertains that the user has not selected the update of a caller's phone number at 250, it terminates the procedure. When the controller 160 ascertains that the user has not selected to store the phone number at 280, the controller 160 terminates the procedure. When the controller 160 ascertains that the user has not selected to store a voice pattern at 272, the controller 160 terminates the procedure.

Figure 3:
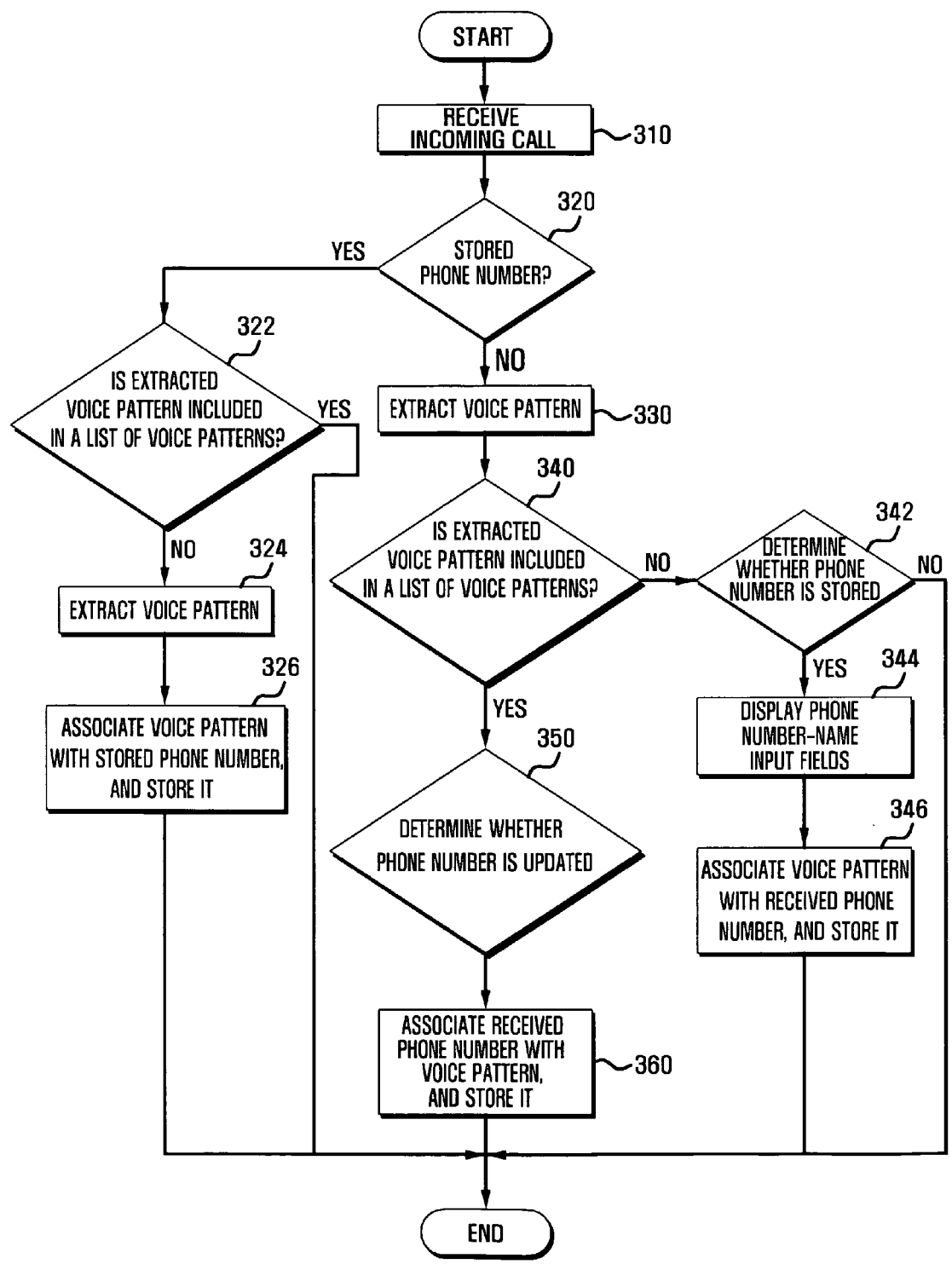
FIG. 3 illustrates a method for updating a phone number according to a second embodiment of the present invention.

FIG. 3 illustrates a method for updating a phone number according to a second embodiment of the present invention. In some embodiments, the storage unit 130 can stores voice patterns, associated with phone numbers.

The controller 160 receives an incoming call via the RF communication unit 110 (block 310). The incoming call includes the voice signal and phone number information of a caller. The controller 160 demodulates and decodes the received voice signal.

The controller 160 determines whether the received phone number is contained in a list of phone numbers stored in the storage unit 130 (block 320). That is, the determination of step 320 is performed before a voice pattern is extracted, which differs from the first embodiment of the method according to the present invention as shown in FIGS. 2A and 2B. When the controller 160 ascertains that the received phone number is contained in a list of phone numbers at 320, it can be assumed that the incoming call has been received with the phone number stored in the storage unit 130. In that case, the controller 160 does not perform a phone number updating process.

Alternatively, when the controller 160 ascertains that the received phone number is not contained in a list of phone numbers at 320, it analyzes the voice signal of the incoming call and extracts a voice pattern there from (block 330). To this end, the controller 160 extracts the parameters, such as voice pitch (frequency), voice intensity (amplitude), sound tone (inherent characteristic of waveform), pronunciation speed, and other pronunciation features (tempo, intonation, accent, the user of words, and the like).

The controller 160 determines whether the extracted voice pattern is included in a list of voice patterns stored in the storage unit 130 (block 340). The storage unit 130 stores voice patterns in a list, i.e., a list of voice patterns. That is, the controller 160 determines whether the voice pattern, extracted at step 330, is identical with one of the voice patterns in a list stored in the storage unit 130. When the controller 160 ascertains that the list of voice patterns contains a voice pattern identical with the extracted voice pattern at 340, the controller 160 displays a message asking whether the user wishes to update a phone number (block 350). That is, the received phone number is new because it was not stored in the storage unit 130 but the voice pattern of the incoming call was stored in the storage unit 130. In that case, it can be assumed that a phone number corresponding to the stored voice pattern was stored in the storage unit 130. Therefore, it can be assumed that the caller is the same but his/her phone numbers differ from each other, which indicates that the caller's phone number has been changed. Accordingly, if the extracted voice pattern is not contained in a list of voice patterns stored in the storage unit 130, the controller 160 concludes that the caller's phone number has been changed.

In that case, the user may not wish to update the caller's phone number with the changed phone number. Therefore, the controller 160 controls the display unit 150 to display a message asking whether the user wishes to update the caller's phone number at 350. Although the embodiment of the present invention is implemented to include step 350, it should be understood that it may be modified in such a way to immediately update the caller's changed phone number without performing step 350.

When the controller 160 ascertains that the user has selected the update of a caller's phone number at 350, it stores the received phone number in the storage unit 130, associated with the stored voice pattern (block 360).

Alternatively, when the controller 160 ascertains that the list of voice patterns does not contain a voice pattern identical with the extracted voice pattern at 340, it displays a message asking whether the user wishes to store a phone number (342). If the controller 160 ascertains that the user has selected to store a phone number at 342, it controls the display unit 150 to display a phone number-name input field (block 344). During the block 344, the portable terminal user inputs a name corresponding to the received phone number through the input unit 140, thereby storing a new phone number. When the portable terminal user inputs a phone number-name into the input unit 140, the controller 160 associates the input phone number-name, the received phone number, and the voice pattern with each other and then stores them in the storage unit 130 (block 346). Therefore, through these processes, a new phone number can be stored in the storage unit 130, associated with a voice pattern.

Meanwhile, when the controller 160 ascertains that the received phone number is contained in a list of phone numbers at 320, it determines whether a voice pattern, associated with the stored phone number, is stored in the list (322). If the controller 160 ascertains that a voice pattern, associated with the stored phone number, is stored in the list at 322, the controller 160 terminates the procedure. Alternatively, if the controller 160 ascertains that a voice pattern, associated with the stored phone number, is not stored in the list at 322, the controller 160 analyzes the voice signal received at step 310 and extracts a voice pattern there from (block 324). This process refers to a case where only a phone number is stored but a voice pattern corresponding thereto is not stored. That is, this process corresponds to the case where the portable terminal user directly inputs a phone number and stores it in the portable terminal. Thereafter, the controller 160 associates the extracted voice pattern with a previously stored phone number, and then stores it (block 326). The controller 160 additionally stores data related to a voice pattern, associated with a previously stored phone number, so that it can automatically update the phone numbers if it receives an incoming call with a changed phone number from the same caller.

Meanwhile, if the controller 160 ascertains that the user has not selected to store a phone number at 342, it terminates the procedure. When the controller 160 ascertains that the user has not selected the update of a caller's phone number at 350, it terminates the procedure.

Figure 4:
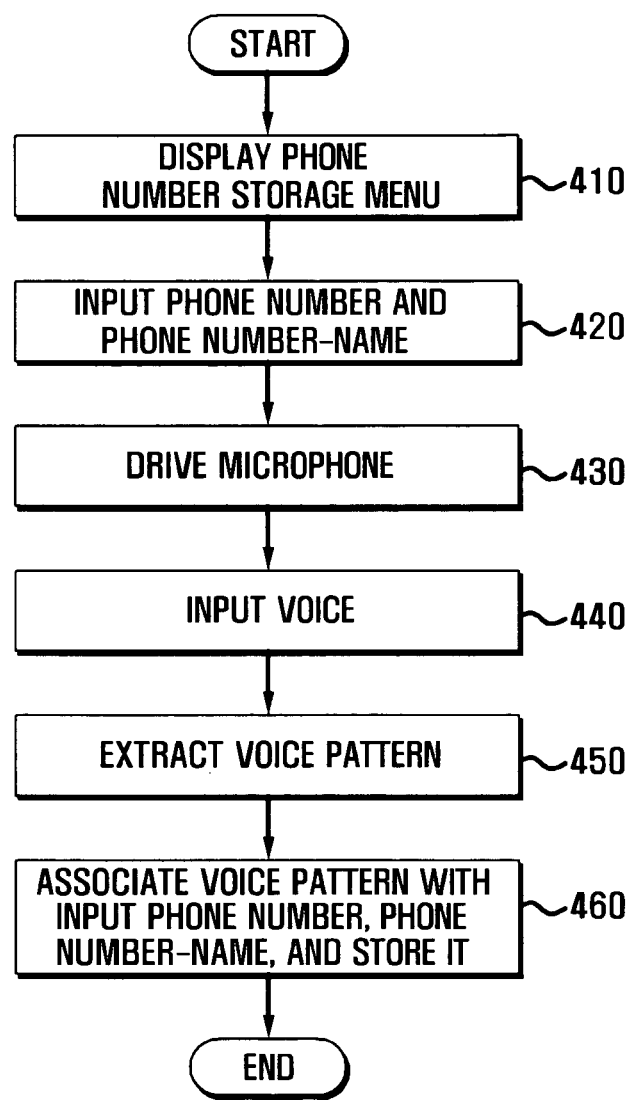
FIG. 4 illustrates a method that associates a directly input phone number with a voice pattern and stores it, according to an embodiment of the present invention.

FIG. 4 illustrate a method that associates a directly input phone number with a voice pattern and stores it, according to an embodiment of the present invention.

When a portable terminal user selects a menu to store a phone number, the controller 160 controls the display unit 150 to display a phone number storing menu (block 410). The phone number storing menu includes submenus, such as a phone number menu, a phone number-name input menu.

When the user inputs a phone number and a phone number-name into the input unit 140, the controller 160 controls the display unit 150 to display the input phone number and phone number-name (block 420).

The controller 160 drives the microphone MIC of the audio processing unit 120 (block 430). When a subscriber (a user) corresponding to a phone number stored in the portable terminal inputs a voice, the controller 160 receives an input signal via the audio processing unit 120 (block 440). The controller 160 can control the display unit 150 to display a message asking the subscriber to input his/her voice, and alternatively control the audio processing unit 120 to output a guide voice to input the voice of the subscriber. The controller 160 analyzes the voice signal output from the audio processing unit 120 and extracts a voice pattern therefrom (block 450). To acquire a voice pattern, the controller 160 extracts parameters, for example, a sound pitch (frequency), a sound intensity (amplitude), a voice tone (inherent characteristic of a waveform), speed of pronunciation, pronunciation features (tempo, intonation, accent, the use of words), and the like.

When the user inputs a storage key into the input unit 140, the controller 160 associates the input phone number, phone number-name, and voice pattern with each other, and then stores them in the storage unit 130 (block 460). The list of phone numbers includes phone numbers, phone number-names, and data related to voice patterns. The stored voice patterns compose a list.

Therefore, when a user directly inputs phone numbers in the portable terminal, the portable terminal can receive and store voices of subscribers associated with the subscribers' phone numbers, respectively. When the same subscribers transmit a call with a changed phone number to a portable terminal that previously stored phone numbers associated with voice patterns, respectively, the portable terminal can automatically update the old phone number of the subscriber with the changed phone number of the subscriber.

As described above, a method and a portable terminal adapted thereto, according to the present invention, can automatically update a phonebook although a user does not directly change and store phone numbers of other parties.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A method for updating phone numbers, the method comprising:
   extracting a voice pattern from a voice signal if an incoming call with the voice signal is received;
   determining whether the extracted voice pattern is contained in a list of voice patterns stored in the portable terminal;
   determining, if the extracted voice pattern is contained in a list of voice patterns stored in the portable terminal, whether a stored phone number matches a received phone number, wherein the stored phone number is associated with one of the list of voice patterns that is identical with the extracted voice pattern; and
   requesting an indication from a user if the stored phone number is not identical to the received phone number.

2. The method of claim 1, further comprising:
   storing an input number, an input name corresponding to the input number, and a voice pattern corresponding to the input number.

3. The method of claim 1, wherein the voice pattern comprises a plurality of parameters.

4. The method of claim 3, wherein the plurality of parameters comprises a voice pitch, a voice intensity, a sound tone, a pronunciation speed, a tempo, an intonation, and an accent.

5. The method of claim 3, wherein the plurality of parameters comprises a pitch average, a pitch standard deviation, the pitch maximum, an energy average, and an energy standard deviation.

6. The method of claim 1, further comprising prompting the user to update the stored phone number.

7. The method of claim 1, wherein determining whether the extracted voice pattern is contained in a list of voice patterns further comprises comparing parameters included in the extracted voice pattern with a plurality of parameters included in the stored voice pattern.

8. A method for updating phone numbers comprising:
determining whether a phone number, received when an incoming call is received, is contained in a list of phone numbers stored in the portable terminal;
extracting a voice pattern from a received voice signal if the received phone number is not contained in a list of phone numbers;
determining whether the extracted voice pattern is contained in a list of voice patterns stored in the portable terminal; and
requesting an indication from a user, if the extracted voice pattern is identical with one of a plurality of voice patterns contained in a list of voice patterns stored in the portable terminal.

9. The method of claim 8, further comprising:
storing an input number, an input name corresponding to the input number, and a voice pattern corresponding to the input number.

10. The method of claim 8, wherein the voice pattern comprises a plurality of parameters.

11. The method of claim 10, wherein the plurality of parameters comprises a voice pitch, a voice intensity, a sound tone, a pronunciation speed, a tempo, an intonation, and an accent.

12. The method of claim 10, wherein the plurality of parameters comprises a pitch average, a pitch standard deviation, the pitch maximum, an energy average, and an energy standard deviation.

13. The method of claim 8, further comprising prompting the user to update a stored phone number.

14. The method of claim 8, wherein determining whether the extracted voice pattern is contained in a list of voice patterns further comprises comparing parameters included in the extracted voice pattern with a plurality of parameters included in the stored voice pattern.

15. A portable terminal capable of updating phone numbers, the portable terminal comprising:

a radio frequency (RF) communication unit configured to receive a voice signal and phone number information;
a storage unit configured to store phone numbers associated with voice patterns; and
a controller configured to:
extracting a voice pattern from a voice signal received via the RF communication unit;
determine whether the extracted voice pattern is stored in the storage unit;
determine, if the extracted voice pattern is stored in the storage unit, whether a stored phone number matches a received phone number, wherein the stored phone number is associated with one of the list of voice patterns that is identical with the extracted voice pattern; and
request an indication from a user, if the stored phone number does not match the received phone number.

16. The portable terminal of claim 15, wherein the voice pattern comprises a plurality of parameters, and wherein the plurality of parameters comprises a voice pitch, a voice intensity, a sound tone, a pronunciation speed, a tempo, an intonation, and an accent.

17. The portable terminal of claim 16, wherein the plurality of parameters comprises a pitch average, a pitch standard deviation, the pitch maximum, an energy average, and an energy standard deviation.

18. The portable terminal claim 17, further comprising a display configured to display messages to prompt the user whether or not to store a number.

19. A portable terminal that updates phone numbers, the portable terminal comprising:
a radio frequency (RF) communication unit for receiving a voice signal and phone number information;
a storage unit configured to store phone numbers associated with voice patterns; and
a controller configured to:
determine whether a phone number, received via the RF communication unit, is stored in the storage unit;
extract a voice pattern from a voice signal, received via the RF communication unit, if the received phone number is not stored in the storage unit;
determine whether the extracted voice pattern is stored in the storage unit; and
request an indication from a user, if the extracted voice pattern is in the storage unit.

20. The portable terminal claim 19, further comprising a display configured to display messages to prompt the user whether or not to store a number.

* * * * *